United States Patent
Solum

(10) Patent No.: US 7,075,903 B1
(45) Date of Patent: Jul. 11, 2006

(54) REDUCED POWER CONSUMPTION IN A COMMUNICATION DEVICE

(75) Inventor: Jeff Solum, Bloomington, MN (US)

(73) Assignee: ADC Telecommunications, Inc., Minnetonka, MN (US)

(*) Notice: Subject to any disclaimer, the term of this patent is extended or adjusted under 35 U.S.C. 154(b) by 737 days.

(21) Appl. No.: 09/291,798

(22) Filed: Apr. 14, 1999

(51) Int. Cl.
*H04B 7/185* (2006.01)

(52) U.S. Cl. .................. 370/311; 370/318; 455/13.4

(58) Field of Classification Search ............. 379/93.36, 379/106.04, 169, 307, 318, 322, 323, 324, 379/348, 795.01, 413, 413.05; 495/18.4, 495/127, 270, 343, 402, 500, 522, 574; 375/222, 375/257, 312; 370/318, 311
See application file for complete search history.

(56) References Cited

U.S. PATENT DOCUMENTS

| | | | |
|---|---|---|---|
| 3,772,596 A * | 11/1973 | Edwards | 375/211 |
| 4,633,462 A * | 12/1986 | Stifle et al. | 370/448 |
| 5,371,734 A | 12/1994 | Fischer | |
| 5,392,287 A * | 2/1995 | Tiedemann et al. | 340/7.34 |
| 5,440,562 A * | 8/1995 | Cutler, Jr | 370/350 |
| 5,491,721 A * | 2/1996 | Cornelius et al. | 375/222 |
| 5,544,082 A * | 8/1996 | Garcia-Duarte et al. | 702/186 |
| 5,729,824 A | 3/1998 | O'Neil et al. | |
| 5,740,540 A * | 4/1998 | Emmermann | 455/458 |
| 5,761,602 A | 6/1998 | Wagner et al. | |
| 5,764,734 A * | 6/1998 | Medendorp et al. | 379/90.01 |
| 5,797,094 A * | 8/1998 | Houde et al. | 455/412 |
| 5,799,069 A * | 8/1998 | Weston et al. | 379/93.33 |
| 5,881,361 A * | 3/1999 | Mannette et al. | 725/148 |
| 5,956,323 A * | 9/1999 | Bowie | 370/241 |
| 6,058,289 A * | 5/2000 | Gardner et al. | 370/311 |
| 6,075,787 A * | 6/2000 | Bobeck et al. | 370/395.2 |
| 6,131,023 A * | 10/2000 | Matsuura | 348/731 |
| 6,151,334 A * | 11/2000 | Kim et al. | 370/468 |
| 6,160,572 A * | 12/2000 | Matsuura | 348/731 |
| 6,178,447 B1 * | 1/2001 | Wannenmacher et al. | 375/222 |
| 6,208,266 B1 * | 3/2001 | Lyons et al. | 340/870.01 |
| 6,233,235 B1 * | 5/2001 | Burke et al. | 370/356 |
| 6,304,596 B1 * | 10/2001 | Yamano et al. | 370/389 |
| 6,307,881 B1 * | 10/2001 | Noma et al. | 358/434 |
| 6,356,538 B1 * | 3/2002 | Li | 370/311 |

FOREIGN PATENT DOCUMENTS

| | | |
|---|---|---|
| EP | 0 615 364 | 9/1994 |
| EP | 0 765 061 A2 | 3/1997 |
| EP | 0 859 515 A2 | 8/1998 |
| EP | 0 907 262 | 4/1999 |
| WO | WO 97/20430 | 6/1997 |
| WO | WO 98/37653 | 8/1998 |

* cited by examiner

*Primary Examiner*—Hassan Kizou
(74) *Attorney, Agent, or Firm*—Fogg and Associates, LLC; David N. Fogg

(57) ABSTRACT

A method for controlling power consumption in a communication device is provided. The method includes powering down a receiver of the communication device for a selected period of time and, when the selected period of time expires, powering up the receiver to check for incoming data.

2 Claims, 3 Drawing Sheets

REDUCED POWER CONSUMPTION IN A COMMUNICATION DEVICE

TECHNICAL FIELD OF THE INVENTION

The present invention relates generally to the field of telecommunications and, in particular, to reduced power consumption in a communication device.

BACKGROUND

Telecommunications networks provide a medium for communicating signals between communication devices. For example, the public switched telephone network (PSTN) typically carries signals representing voice communications between telephones coupled to the telephone network. The telephone network can also carry signals that represent other types of communications, such as data between computer modems or other communication devices.

Another typical telecommunications network is the cable network. The cable network conventionally carries signals representing video programming from a head end to subscriber's equipment, e.g., a television or a set top box.

The cable industry has recently experimented with bi-directional communication over existing cable networks. Bi-directional communications allow cable networks to provide, for example, video-on-demand, Internet access and telephony services over existing cable networks. These services are implemented by connecting subscriber's equipment to the cable network via a cable modem or other appropriate communications device.

With the conventional telephone system, the communication devices, e.g., telephones, are typically powered by the telephone network. Since the telephone network uses batteries to back-up line power, a conventional telephone functions properly even if power is lost at the subscriber's location.

One problem with conventional approaches to cable modems is providing power to the modems. Cable modems can either be powered from a power source located at the subscriber's location or powered using network power. When local power is used, if the subscriber loses power, the cable modem ceases to function. This reduces the effectiveness of the cable company in competing with the telephone companies to provide new services to subscribers. However, powering cable modems with network power is not a trivial matter because cable modems consume large quantities of power.

Power constraints on communications devices are also prevalent in other communications networks. For example, communications devices that rely on battery power have limited effectiveness due to power consumption issues. In wireless networks, wireless terminals, e.g., cellular telephones, typically run on battery power. One problem with these communication devices is that the battery life is short due to power requirements to run the wireless terminal in standby mode.

For the reasons stated above, and for other reasons stated below which will become apparent to those skilled in the art upon reading and understanding the present specification, there is a need in the art for a communication device with reduced power requirements.

SUMMARY

The above mentioned problems with communication devices and networks and other problems are addressed by the present invention and will be understood by reading and studying the following specification. A communication device is described that selectively, and repeatedly turns off its receiver for a period of time to conserve power.

In particular, an illustrative embodiment of the present invention includes a method for controlling power consumption in a communication device. The method includes powering down a receiver of the communication device for a selected period of time and, when the selected period of time expires, powering up the receiver to check for incoming data. In one embodiment, the method is timed to allow detection of attempted retransmission of unacknowledged packets. In another embodiment, sleep counters at remote and head end communication devices are synchronized when a receiver of the remote communication device is powered down so that data can be transmitted to the remote communication device from the head end communication device after the receiver of the remote communication device is re-powered up.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
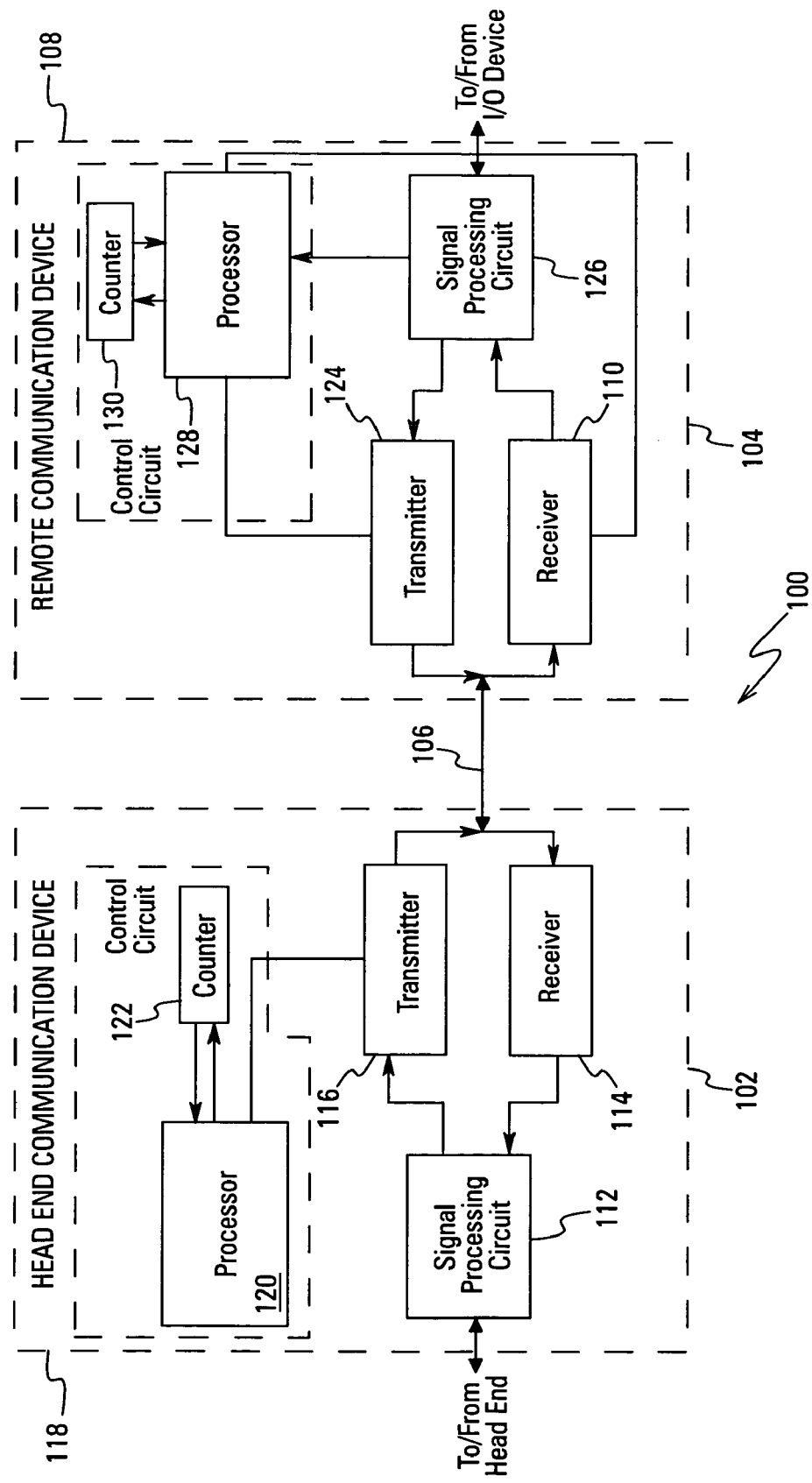
FIG. 1 is a block diagram of an embodiment of a communication system according to the teachings of the present invention.

FIG. 1 is a block diagram of an embodiment of a communication system, indicated generally at 100, and constructed according to the teachings of the present invention. Communication system 100 includes head end communication device 102 and remote communication device 104 that are communicatively coupled over communication link 106. In one embodiment, communication system 100 is a cable network. In this embodiment, remote communication device 104 is a cable modem and head end communication device 102 is a cable modem terminating system. Communication link 106 comprises, for example, coaxial cable, a hybrid fiber/coax link or other appropriate link for a cable network. In other embodiments, communication network 100 comprises a wireline communication network, wireless communication network, e.g., cellular, or other appropriate communication network.

For simplicity, network 100 is described in terms of a single remote communication device 104 and a single head end communication device 102. It is understood that an implementation of network 100 can include any appropriate number of head end communication devices and any appropriate number of remote communication devices.

Remote communication device 104 includes circuitry that is used to communicate data to and from head end communication device 102. Remote communication device 104 includes receiver 110 and transmitter 124 that are coupled to communication link 106. Receiver 110 and transmitter 124 are also coupled to signal processing circuit 126. Signal processing circuit 126 is coupled to input/output devices (I/O devices) such as, for example, a computer, a telephone, a set top box, etc. Signal processing circuit 126 implements the communication protocols necessary for remote communication device 104 to operate in the environment of network 100. For example, signal processing circuit 126 may implement protocols for voice, data, and/or telephony signals in a wired or wireless network.

In one embodiment, remote communication device 104 is powered using power provided over network 100 so as to provide battery-backed power in the event of a power outage at the location of remote communication device 104. In an alternative embodiment, remote communication device 104 is powered from a battery or other power supply.

Remote communication device 104 includes control circuit 108 to reduce the power consumption at remote communication device 104. Advantageously, control circuit 108 reduces the power consumption of remote communication device 104 by selectively powering down receiver 110, or parts of the receiver circuitry, for a selected period of time. Control circuit 108 powers up receiver 110, or the necessary parts of the receiver circuitry, within an amount of time after power-down sufficient so as to assure that all data is properly received at remote communication device 104.

The duration of the power down should be selected so as not to interfere with the normal operation of an application. In the case of a telephone call, for example, the duration can be set at a time interval long enough that a first attempt to ring a telephone could be missed but short enough such that a second ring would always be successful. In the case of data, the time delay is set to a sufficiently slight delay since only a slight delay can be tolerated on the first data packet of a data transfer such as web browsing.

Control circuit 108 includes processor 128. Processor 128 is coupled to counter 130. Processor 128 is also coupled to receive signals, including a "Last Packet Sent" message, from signal processing circuit 126. Processor 128 generates signals to selectively power down receiver 110 based on the signals from signal processing circuit 126 and counter 130 using, for example, the method shown and described with respect to FIG. 3 below. Alternatively, processor 128 and counter 130 can power down receiver 110 for a time that does not interfere with the ability of receiver 110 to detect attempted retransmissions by head end communication device 102 once receiver 110 is powered up again.

Head end communication device 102 includes circuitry that is used to communicate data to and from remote communication device 104. Namely, head end communication device 102 includes signal processing circuit 112. Signal processing circuit 112 processes signals from the head end for transmission by transmitter 116 to remote communication device 104. Signal processing circuit 112 further processes signals from remote communication device 104 that are received at receiver 114.

In one embodiment, head end communication device 102 also includes control circuit 118 to provide a synchronous implementation. Control circuit 118 controls the transmission of signals by transmitter 116 over communication link 106 to receiver 110. Control circuit 118 includes processor 120 and counter 122. Processor 120 is programmed to determine when receiver 110 is powered-up to receive data from transmitter 116 using, for example, the process described below with respect to FIG. 2.

In another embodiment, processor 120 uses the TCP/IP or similar retransmission protocol to cause transmitter 116 to retransmit unacknowledged packets until such time that receiver 110 is powered up and acknowledges receipt of data transmitted by transmitter 116. This is an asynchronous implementation.

Figure 2:
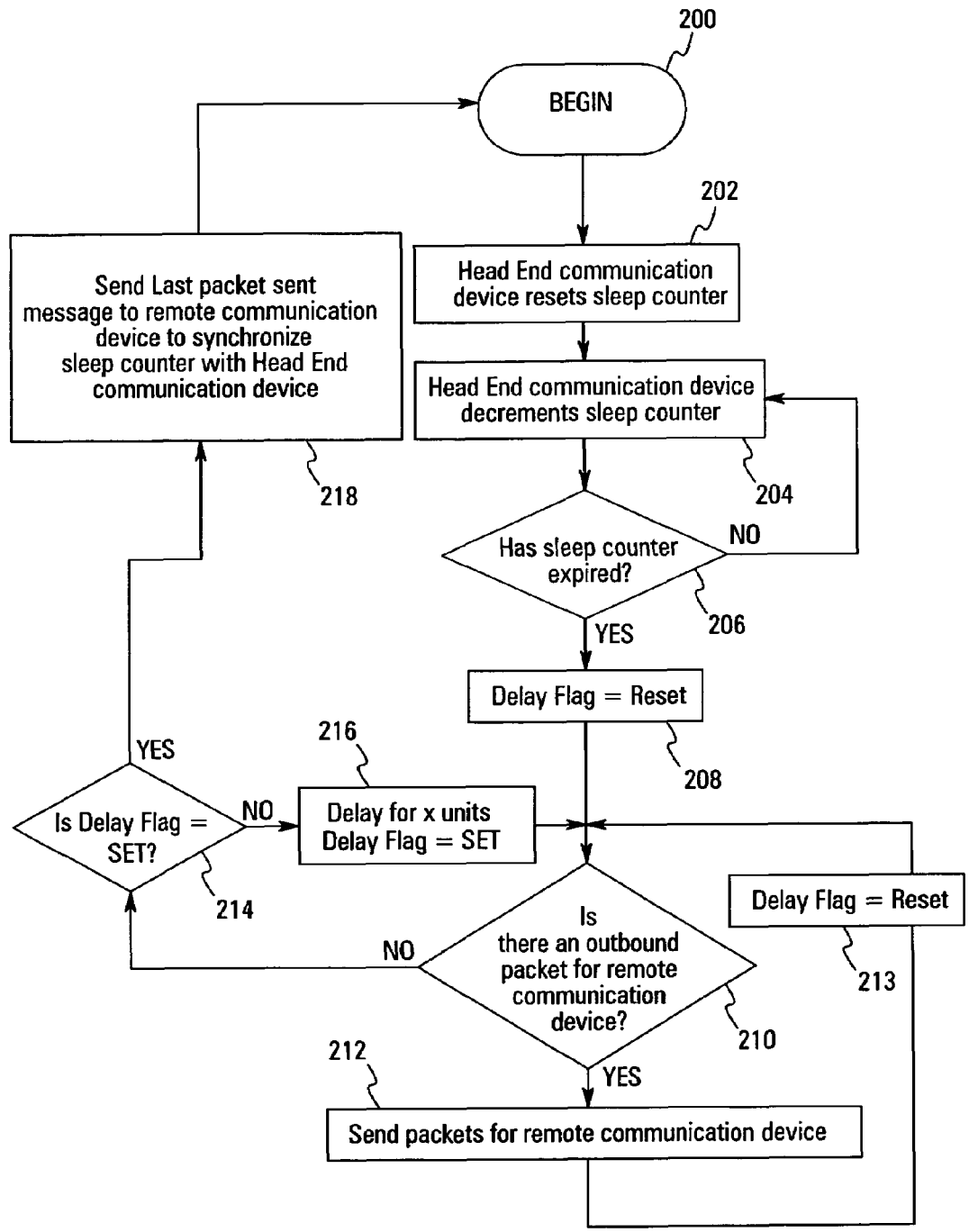
FIG. 2 is a flow chart that illustrates an embodiment of a method for controlling transmission of data over a communication system to a remote communication device according to the teachings of the present invention.
Figure 3:
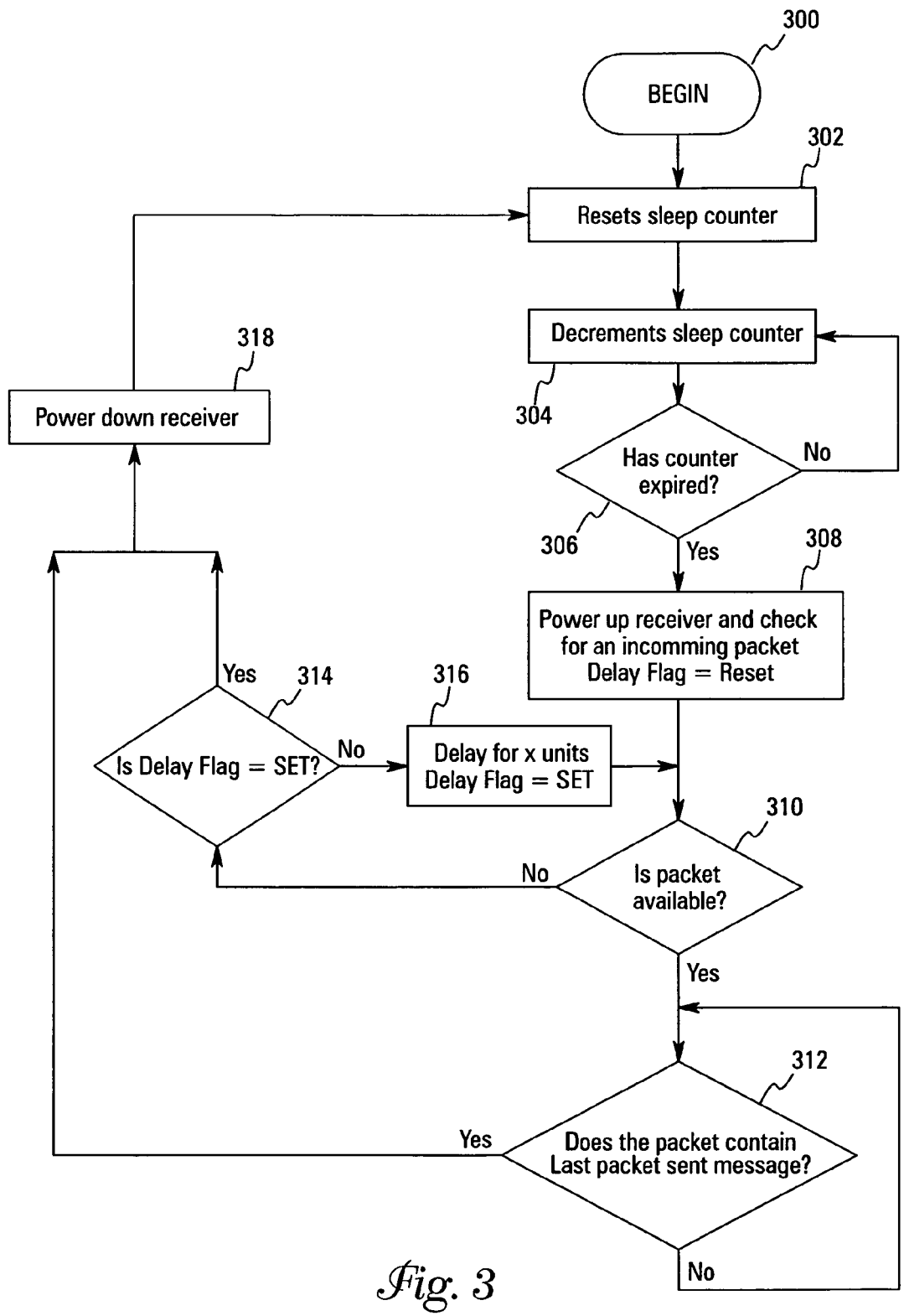
FIG. 3 is a flow chart that illustrates an embodiment of a method for controlling the power to a receiver at a remote communication device in a communication system according to the teachings of the present invention.

FIGS. 2 and 3 are flow charts that illustrate methods that are implemented at a head end communication device and a remote communication device, respectively, to selectively control the power to a receiver of the remote communication device. These methods work together to reduce the power consumed by the remote communication device. The flow chart of FIG. 2 illustrates an embodiment of a method for controlling transmission of data by a head end communication device over a communication system to the remote communication device. The flow chart of FIG. 3 illustrates an embodiment of a method for controlling the power to a receiver at the remote communication. Each of the flow charts are described in turn below.

The method of FIG. 2 is implemented at the head end communication device and begins at block 200. At block 202, the head end communication device resets its sleep counter. The value of the sleep counter indicates when the receiver at the remote communication device is in a sleep or power-down mode. The reset of this sleep counter is substantially synchronized with the resetting of a similar sleep counter at the remote communication device because the remote communication device resets its sleep counter based on a "Last Packet Sent" message from the head end communication device as described in more detail below. Advantageously, the head end communication device maintains this substantial synchronization of sleep counters without receiving any signals from the remote communication device.

The head end communication device waits for the sleep counter to expire before transmitting any data to the remote communication device. At block 204, the head end communication device decrements its sleep counter. At block 206, the head end communication device determines whether the sleep counter has expired. If not, the method returns to block 204 and decrements the sleep counter. If the sleep counter has expired, the method proceeds to block 208 and sets a DelayFlag to a "reset" value.

With the sleep counter expired, the head end communication device next attempts to transmit data to the remote communication device since the receiver at the remote communication device should be powered up. At block 210, the head end communication device determines whether there are any data packets to be sent to the remote communication device. If there are data packets, the data packets are sent at block 212. At block 213, the method sets DelayFlag to "Reset" since DelayFlag must remain at a Reset value as long as data is being received. The method returns to block 210. If there are no data packets, the method proceeds to block 214.

At block 214, the head end communication device checks the state of the DelayFlag. If the DelayFlag is not "SET," the head end communication device delays for X units, sets the DelayFlag to "SET" and returns to block 210 to determine whether there are any more data packets for the remote communication device. The delay, typically known as "guard time," at this point accounts for timing variations between the sleep counters at the head end communication device and the remote communication device. A similar delay is implemented at the remote communication device.

If at block 214, the head end communication device determines that the DelayFlag is "SET," the method proceeds to block 218 since data packets, if any, have been sent and the head end communication device has waited the established delay period for additional data.

At block 218, the head end communication device sends a "Last Packet Sent" message to the remote communication device. This allows the sleep counters at the head end communication device and the remote communication device to be substantially synchronized. The method returns to block 202 and resets the sleep counter.

The method of FIG. 2 has been described in terms of a head end communication device that transmits packets to a single remote communication device. It is understood that this method can be used with a number of counters systematically adjusted in time at the head end communication device to control any appropriate number of remote communication devices.

The method of FIG. 3 is implemented at the remote communication device and begins at block 300. At block 302, the remote communication device resets its sleep counter. The value of the sleep counter indicates when the receiver at the remote communication device is in a sleep or power-down mode. The reset of this sleep counter is substantially synchronized with the resetting of a similar sleep counter at the head end communication device because the remote communication device resets its sleep counter based on a "Last Packet Sent" message from the head end communication device as described above.

The remote communication device waits for the sleep counter to expire before checking for any data from the head end communication device. At block 304, the remote communication device decrements its sleep counter. At block 306, the remote communication device determines whether the sleep counter for the remote communication device has expired. If not, the method returns to block 304 and decrements the counter. If the counter has expired, the method proceeds to block 308 and powers up the receiver at the remote communication device to check for incoming data. The remote communication device also sets a DelayFlag to a "reset" value.

With the sleep counter expired, the remote communication device next checks for data from the head end communication device. At block 310, the remote communication device determines whether any data packets have been received from the head end communication device. If there are data packets, the packets are analyzed in turn at block 312 to determine whether a "Last Packet Sent" message has been received. When the "Last Packet Sent" message is received, the remote communication device powers down the receiver at block 318.

If at block 310, the remote communication device determines that no packets are available, the method proceeds to block 314. At block 314, the remote communication device checks the state of the DelayFlag. If the delay flag is not "SET," the remote communication device delays for X units, sets the DelayFlag to "SET" and returns to block 310 to determine whether there are any data packets from the head end communication device.

If at block 314, the remote communication device determines that the DelayFlag is "SET," the method proceeds to block 318 and powers down the receiver. The method returns to block 302 and rests the sleep counter.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the techniques for reducing power consumption can also be used in other types of communications networks, such as, for example, wireless networks (PCS and cellular). Further, other techniques can be used to select the time period of the sleep mode for the receiver at the remote communication device.

What is claimed is:

1. A method for controlling power consumption in a remote communication device in signal communication with a head end communication device, the method comprising:
   staring a counter for the remote communication device to time a predetermined power down period;
   powering down the remote communication device for the predetermined power down period;
   powering up the remote communication device to check for any incoming data;
   starting a counter for the head end communication device to time for substantially the same predetermined power down period after completion of a data transmission to the remote.

2. A method for controlling power consumption in a remote communication device in signal communication with a head end communication device, the method comprising:
   starting a counter at the remote communication device to count for a predetermined power down period after the remote unit has received a transmission of a final packet or other indication that transmission from the head end communication device has come to an end;
   starting a counter at the head end communication device at substantially the same time as the remote communication device counter is set;
   wherein a substantial synchronization is maintained between the counters.

* * * * *